United States Patent Office 3,405,353
Patented Oct. 8, 1968

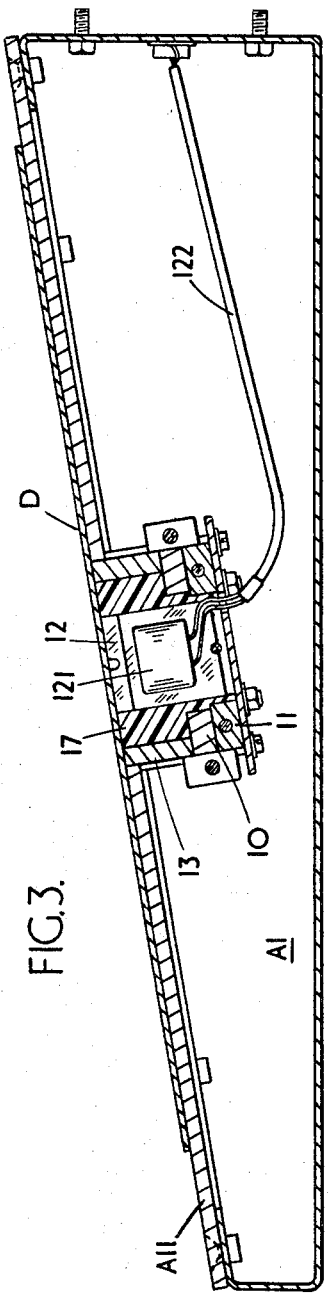
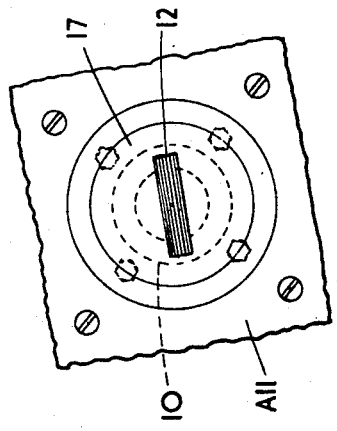

3,405,353
MAGNETIC THICKNESS GAUGE USING SIMULTANEOUS CONSTANT AND AC MAGNETIZATION
Terence Princep Smith and Keith Malcolm Lack, Tipton, England, assignors to Teledictor Limited, Tipton, England, a corporation of Great Britain and Northern Ireland
Filed Apr. 6, 1966, Ser. No. 545,202
Claims priority, application Great Britain, July 21, 1965, 30,990/65
8 Claims. (Cl. 324—34)

ABSTRACT OF THE DISCLOSURE

Apparatus for measuring the thickness of sheets of ferromagnetic materials involving magnetization of such a sheet to saturation and measurement of the saturation flux. This flux is caused to flow around a complete magnetic circuit and is measured at a position in the circuit remote from the sheet. Measurement takes place by obtaining a measure of amplitudes of current peaks in a coil which surrounds a core in the magnetic circuit, the current driving the core to saturation and the current peaks thus depending on the flux of said magnetic circuit flowing through the core.

---

Figure 1:
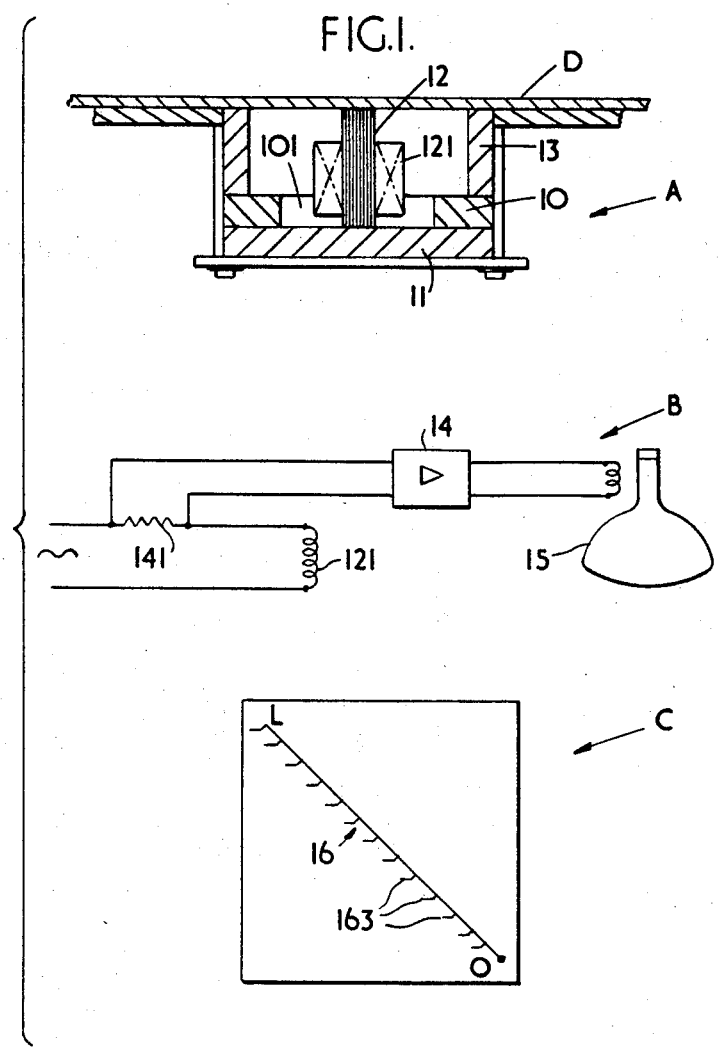

This invention has reference to apparatus for measuring the thickness of sheets of ferromagnetic materials and is concerned more particularly although not specifically with apparatus for measuring or gauging and indicating visually the thickness of tinplate sheets having a thickness in the range of 0.006″ to 0.024″.

The invention has for its primary objective to provide apparatus for measuring the thickness of tinplate sheets of the order of thickness aforesaid which is substantially instantaneous in action and which affords a visual indication of thickness on a calibrated scale with a high degree of discrimination between the various thicknesses graduated on the scale.

The invention is based on the principle that if sufficient magnetic flux is passed through a sheet under test to saturate the material magnetically completely and the saturation flux density of the sheet under test is maintained substantially constant the total flux passing through the sheet is a function only of the area of the flux path, which, if the remainder of the magnetic circuit is kept constant, is proportional to the sheet thickness.

Accordingly the invention consists of apparatus for measuring the thickness of sheets of ferromagnetic material comprising a sensing head consisting of a permanent magnet or electromagnet powerful enough either directly or indirectly through an interposed flux responsive member to saturate magnetically the thickest sheet to be tested and on which permanent magnet or electromagnet or flux responsive member the sheet to be tested is required to be rested, a flux plate on which the said permanent magnet or said electromagnet is mounted and which is large enough to carry the total flux produced by the said permanent magnet or said electromagnet, a laminated yoke assembly adapted to rest on the flux plate and to contact with the underside of the sheet to be tested when placed on the permanent magnet or electromagnet aforesaid or on the flux responsive member and which laminated yoke assembly is in magnetic circuit with the said permanent magnet or said electromagnet and flux plate, the areas of the said flux plate and laminated yoke assembly being large enough to remain unsaturated when the magnetic circuit is completed by the thickest sheet to be tested, a search coil or coils wound around the laminated yoke assembly, means for applying an alternating EMF to the said search coil or coils and means for monitoring the total flux and displaying the total flux of any test on an indicating device consisting of a scale graduated in terms of thicknesses which operates in conjunction with the electron beam of a cathode ray tube which is influenced by a series of pulses derived from the search coil or coils and which repeat every unidirectional half-cycle of the electric current induced in the search coil whilst the alternating EMF is applied thereto and which pulses are caused to be sensed by the scanning coils of a cathode ray tube, said unidirectional half-cycles having an amplitude proportional to the thickness of the sheet being tested whereby an indication of the thickness of a sheet under test can be read off on the scale aforesaid.

The invention also resides in apparatus for measuring the thickness of sheets of ferromagnetic material constructed, arranged and adapted for use substantially as will be described hereinafter.

An embodiment of the invention will now be described with particular reference to the accompanying drawings which illustrate the invention as applied to apparatus for measuring the thickness of tinplate sheets in the range 0.006″ to 0.024″ on a continuous long calibrated scale with a high degree of discrimination between the calibrations.

Figure 2:
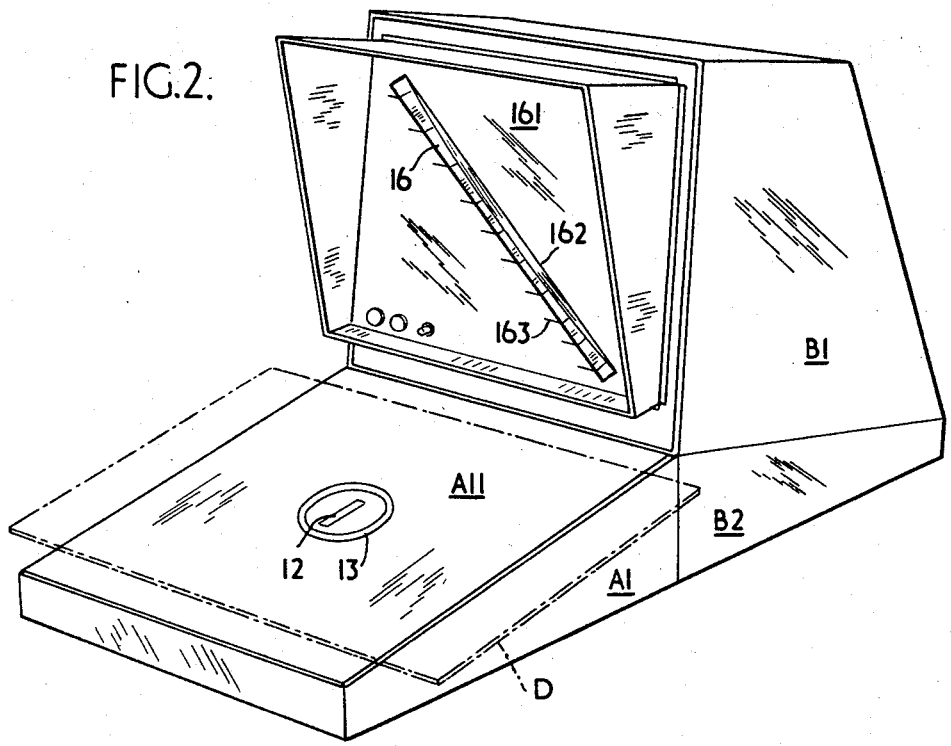
Figure 5:
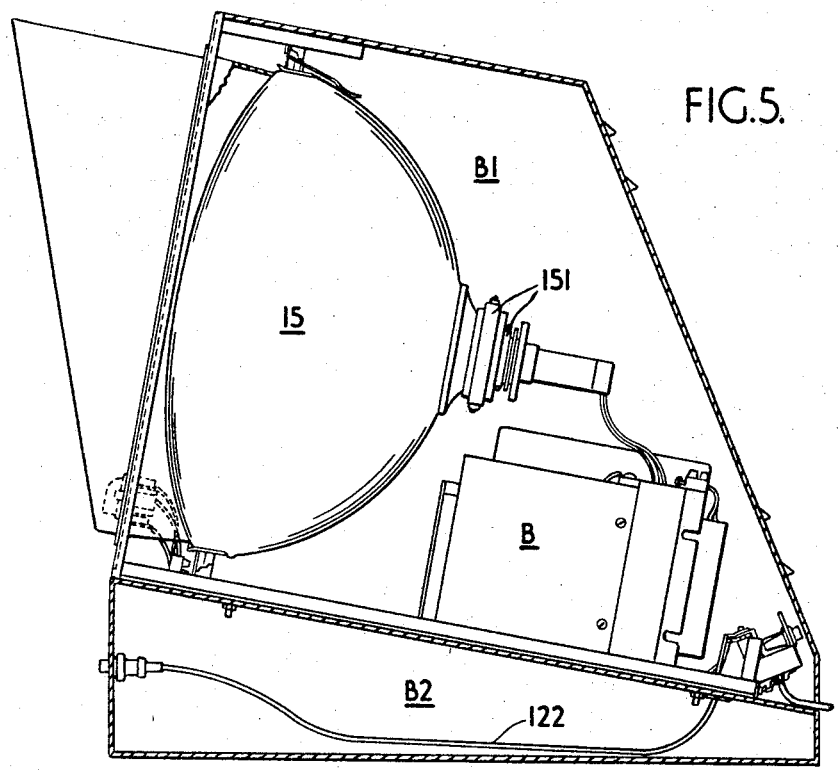

In the drawings—
FIGURE 1 is a diagrammatic view illustrating separated the three essential component units of the apparatus.
FIGURE 2 is a perspective view of the apparatus as available in commerce.
FIGURE 3 is a longitudinal section on an enlarged scale of the forepart of the apparatus as illustrated in FIGURE 2.
FIGURE 4 is a plan of the sensing head as incorporated in the forepart of the apparatus illustrated in FIGURE 3.
FIGURE 5 is a view on an enlarged scale partly in longitudinal section and partly in elevation of the rear portion of the apparatus as illustrated in FIGURE 2.

In the drawings like numerals and letters of reference indicate similar parts in the several views.

According to the said embodiment of the invention the apparatus consists of three units, namely:

(1) A sensing head, designated generically by the reference letter A,
(2) An amplifier unit designated generically by the reference letter B, and
(3) A display device based on a cathode ray tube designated generically by the reference letter C.

The sensing head A aforesaid consists of a permanent ring magnet 10 which is powerful enough to saturate the thickest sheet to be tested for thickness, a lower flux plate 11 on which the ring magnet 10 rests and which is large enough to carry the total flux produced by the said ring magnet 10 without magnetically saturating a laminated yoke assembly 12 of thin sheet steel stampings of known formation. This laminated yoke assembly 12 rests on the central portion of the flux plate 11 and projects through the hole 101 in the ring magnet 10 but with a clearance between the sides and ends of the said laminated yoke assembly 12 and the inner periphery of the ring magnet 10, see FIGURE 4.

Superposed on the ring magnet 10 and in magnetic contact therewith is an annular flux sleeve 13 the upper surface of which is on the same plane as the top of the laminated yoke assembly 12 when rested on the flux plate 11 and which surfaces are contacted by the underside of the sheet D the thickness of which is to be ascertained when the said sheet D is rested on top of the said flux sleeve 13 and the top of the laminated yoke assembly 12.

Wound around the laminated yoke assembly 12 is a search coil 121. The flux sleeve 13 and the laminated yoke assembly 12 are so arranged that the sheet D under test is in intimate contact with the whole of the area presented to it by the presented surface of the flux sleeve 13 and of the laminated yoke assembly 12 so that there will be a flux in the laminated yoke assembly 12 which is proportional to the thickness of the sheet D to be tested according to the basic principle hereinbefore stated.

Provision is made for applying an alternating EMF to the search coil 121 by way of a lead 122 so that the peak value of electric current which flows through the search coil 121 will be a function of the degree of magnetic flux in the laminated yoke assembly 12 which serves as a core and hence of the thickness of the sheet D under test.

The amplifier unit B incorporates a resistance 141 of low value which is connected in series with the search coil 121 and in parallel with an amplifier 14 of known construction which is designed so as to amplify only unidirectional half-cycles of an alternating electric current and to reject the unwanted half-cycle.

The display device C comprises a relatively large cathode ray tube 15 with which is associated settable magnetic means 151 for causing the electron beam to be deflected towards one end of the cathode ray tube 15 to constitute the starting point O for collaboration with a calibrated scale 16 on a screen 161 placed over the cathode ray tube 15 and which scale 16 runs diagonally from a position in front of the said startin point O upwardly to the other end L of the scale 16. The said scale 16 is graduated in terms of thicknesses within the limits of the range proposed for the apparatus and bounds one side of a slot 162 in the screen 161.

As illustrated in FIGURE 2 the spot of the cathode ray tube 15 is caused to be visible through an inclined slot 162 of the screen 161 the lower marginal edge of which is calibrated as at 163 in terms of thickness.

The sensing head A is housed within a separately formed detachable sheet metal housing A1, see FIGURES 2 and 3, with the upper end of the said sensing head located in a cut-out in the inclined top surface A11 of the said housing A1 with the upper end of the sensing head A in the same plane as the inclined top surface A11. The inclined surface A11 serves as the support for the sheet D being tested at any one time.

The cathode ray tube, amplifier unit and other components of the display device are mounted in or on a separately formed detachable sheet metal housing B1 which in turn is bolted to a sub-posed separately formed detachable sheet metal base housing B2.

The base housing B2 with the sub-posed housing B1 is bolted end to end with the housing A1, the two ends of the housings A1 and B2 carrying the complementary connector components for the lead 122.

In use the tinplate sheet D the thickness of which is to be ascertained is placed in intimate contact with the upper surface of the flux sleeve 13 and the top of the laminated yoke assembly 12 in magnetic circuit therewith and thus with the ring magnet 10 and flux plate 11 whereupon alternating EMF is applied to the search coil 121 and since the magnetic flux in the laminated yoke assembly 12 is produced by the permanent ring magnet 10, the flux is unidirectional and hence the amplitude of the alternating current will differ between positive and negative half-cycles depending upon whether the alternating ampere turns produced by the search coil 121 add or subtract from the unidirectional flux.

For the purposes of the invention however, it is only necessary to measure the amount of flux in the laminated yoke assembly 12 which constitutes the core.

The current passing through the search coil 121 is fed by way of the resistance 141 of low value and produces a voltage pulse proportionate to the current which is fed to the amplifier unit 14 so that the output of the said amplifier unit 14 consists of a series of pulses which repeat every half-cycle of the alternating EMF and have an amplitude proportional to the thickness of the sheet D being tested and which are at a power level compatible with the drive requirements of the scanning coils of the relatively large cathode ray tube 15.

The application of the output pulses from the amplifier unit 14 to the scanning coils of the cathode ray tube 15 which are aligned so that the field produced by them opposes the field produced by magnetic means for causing the electron beam to be deflected towards the starting point end O of the cathode ray tube 15 and causes the "spot" of the cathode ray tube 15 to move from the starting point O and to return to the starting point O for every pulse of the amplifier unit 14 the distance moved by the "spot" being proportional to the amplitude of the pulse. Assuming the repetition rate of the pulses to be sufficiently high the movement of the "spot" will appear as a continuous line on the scale and the thicknesses can be read off directly on the scale 16 at a point coincident with the end of the line.

The use of a relatively large cathode ray tube 15 in conjunction with a diagonal scale 16 permits of a high degree of discrimination to be obtained between the calibrations 162 on the scale 16.

The response time of the apparatus is virtually instantaneous.

With a view to preventing displacement of the laminated yoke assembly 12 after assembly on the flux plate 11 and projecting through the hole in the ring magnet 10 the whole of the space surrounding the said laminated yoke assembly 12 is filled with a non-conducting synthetic plastics material 17, preferably a polyester resin, which is cured in situ.

If preferred the laminated yoke assembly 12 may be wound with more than one search coil 121.

Further, if preferred an electromagnet may be used in place of a permanent magnet.

What we claim is:

1. Apparatus for measuring the thickness of sheets of ferromagnetic material comprising a measuring head incorporating:
   (a) a magnet of constant magnetising force,
   (b) a saturable magnetic core,
   (c) elements of ferromagnetic material interconnecting the magnet and core and together therewith forming a magnetic circuit,
   (d) two magnetic poles formed in said magnetic circuit having coplanar surfaces for engagement with a sheet of ferromagnetic material to be measured,
   (e) the magnetizing force of said magnet being sufficient to saturate the thickest sheet of ferromagnetic material to be measured, with the magnetic circuit remaining unsaturated, said apparatus also comprising a measuring circuit incorporating,
   (f) a conductive winding surounding said saturable core,
   (g) a load in said measuring circuit connected in series with said winding,
   (h) means connected across said load and conductive winding for applying an alternating electromotive force to said winding sufficient when the core is biased in a forward direction by magnetic flux from said magnet flowing through said magnetic circuit and said sheet of ferromagnetic material, to drive the core to saturation in a forward direction but not sufficient to drive said core to saturation in a reverse direction,
   (i) a current pulse being generated in the measuring circuit on saturation of said core, variation of thickness of the sheet to be measured altering the magnetic bias in said core and thereby altering the instantaneous voltage across said measuring circuit at saturation and thus the amplitude of the current pulse, and
   (j) means for displaying the amplitude of the voltage pulse across the load as a measure of the current pulse through said load at saturation and thus as a measure of thickness of the sheet of ferromagnetic material.

2. Apparatus according to claim 1, said core being a laminated yoke assembly.

3. Apparatus according to claim 1, said magnet being a permanent ring magnet.

4. Apparatus according to claim 3, the elements of ferromagnetic material of said magnetic circuit including a flux plate on which said ring magnet is mounted and a flux sleeve surrounding the core and extending from the flux plate to form one of said poles, said core extending from the flux plate and forming said other pole.

5. Apparatus according to claim 3, the elements of ferromagnetic material of said magnetic circuit including a flux plate on which said ring magnet is mounted and a flux sleeve surrounding the core and extending from the flux plate to form one of said poles, said core extending from the flux plate and forming said other pole and said flux sleeve being filled with synthetic resin.

6. Apparatus according to claim 1, said means for displaying the amplitude of the voltage pulse incorporating a cathode ray tube.

7. Apparatus according to claim 1, including a housing within which said measuring head is mounted, said housing having a flat upper face and the poles of the measuring head being flush with said upper face whereby the face provides support for a sheet to be measured.

8. Apparatus according to claim 3, the elements of ferromagnetic material of said magnetic circuit including a flux plate on which said ring magnet is mounted and a flux sleeve surrounding the core and extending from the flux plate to form one of said poles, said core extending from the flux plate and forming said other pole, and also including a housing in which the measuring head is mounted, said housing having a flat upper face and the poles of the measuring head being flush with said upper face whereby the face provides support for a sheet to be measured.

References Cited

UNITED STATES PATENTS

| | | | |
|---|---|---|---|
| 2,733,358 | 1/1956 | Carapellotti | 324—121 |
| 2,935,680 | 5/1960 | Bendix et al. | 324—34 |

FOREIGN PATENTS 599,601  3/1948  Great Britain.

OTHER REFERENCES

Carlisle, S. S.: A Steel-Plate Thickness Meter Instruments; vol. 26; December 1953; pp. 1880, 1881, 1903, 1904.

ARCHIE R. BORCHELT, *Primary Examiner.*

R. J. CORCORAN, *Assistant Examiner.*